(12) United States Patent
Kim et al.

(10) Patent No.: US 11,807,092 B2
(45) Date of Patent: Nov. 7, 2023

(54) VEHICULAR BATTERY UNIT AND VEHICULAR UNDERBODY INCLUDING THE SAME

(71) Applicants: Hyundai Motor Company, Seoul (KR); Kia Corporation, Seoul (KR)

(72) Inventors: Sang Wan Kim, Busan (KR); Kyung Ho Kim, Gyeonggi-do (KR); Hyeon Su Jin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 17/522,712

(22) Filed: Nov. 9, 2021

(65) Prior Publication Data

US 2022/0072943 A1     Mar. 10, 2022

Related U.S. Application Data

(63) Continuation-in-part of application No. 16/827,604, filed on Mar. 23, 2020, now Pat. No. 11,235,670.

(30) Foreign Application Priority Data

Oct. 4, 2019    (KR) ................. 10-2019-0123264
Nov. 30, 2020    (KR) ................. 10-2020-0164467

(51) Int. Cl.
    *B60K 1/02*            (2006.01)
    *B60K 1/04*            (2019.01)
    (Continued)

(52) U.S. Cl.
    CPC ............... *B60K 1/04* (2013.01); *B60L 50/64* (2019.02); *B60L 58/26* (2019.02);
    (Continued)

(58) Field of Classification Search
CPC ... B60K 1/04; B60K 2001/0438; B60L 50/64; B60L 58/26; H01M 10/6554; H01M 10/6556; H01M 50/209; H01M 2220/20
See application file for complete search history.

(56) References Cited

U.S. PATENT DOCUMENTS 4,365,681 A     12/1982   Singh
5,385,793 A *   1/1995   Tiedemann ....... H01M 10/6556
                                    429/62

(Continued)

FOREIGN PATENT DOCUMENTS

DE      10 2015 000578 A1     7/2016
EP            2199133 A2     6/2010
KR     10-2012-0114638 A     10/2012

OTHER PUBLICATIONS

Office Action dated Apr. 12, 2023 in U.S. Appl. No. 17/522,213.

*Primary Examiner* — Jason D Shanske
*Assistant Examiner* — James J Triggs
(74) *Attorney, Agent, or Firm* — Fox Rothschild LLP

(57) ABSTRACT

A vehicular battery unit includes a lower case including a pair of battery-receiving sections disposed at two lateral sides of a vehicle, and a connecting section, which is disposed between the pair of battery-receiving sections and is bent so as to be convex upwards, battery modules respectively mounted in the pair of battery-receiving sections, cooling blocks, which are disposed under the battery modules and which receive and discharge cooling water to cool the battery modules, at least one cooling water hose configured to exchange cooling water with the cooling blocks, and an upper case, which is disposed on the lower case and includes a cooling water hose coupler unit configured to connect the cooling water hose to the cooling blocks.

20 Claims, 15 Drawing Sheets

(51) Int. Cl.
  *B60L 50/64* (2019.01)
  *B60L 58/26* (2019.01)
  *H01M 50/209* (2021.01)
  *H01M 10/6554* (2014.01)
  *H01M 10/6556* (2014.01)
  *B60K 1/00* (2006.01)

(52) U.S. Cl.
  CPC ... *H01M 10/6554* (2015.04); *H01M 10/6556* (2015.04); *H01M 50/209* (2021.01); *B60K 2001/005* (2013.01); *B60K 2001/0438* (2013.01); *H01M 2220/20* (2013.01)

(56) References Cited

U.S. PATENT DOCUMENTS

| | | | |
|---|---|---|---|
| 5,390,754 A | 2/1995 | Masuyama et al. | |
| 5,456,994 A * | 10/1995 | Mita | H01M 10/625 |
| | | | 429/71 |
| 5,585,204 A * | 12/1996 | Oshida | H01M 50/209 |
| | | | 429/62 |
| 6,632,560 B1 | 10/2003 | Zhou et al. | |
| 7,638,233 B2 | 12/2009 | Vettoretti et al. | |
| 8,967,312 B2 | 3/2015 | Yanagi | |
| 9,444,124 B2 * | 9/2016 | Beltz | H01M 10/613 |
| 9,499,205 B1 * | 11/2016 | Elia | B60K 6/28 |
| 9,925,890 B2 * | 3/2018 | Enning | B60L 50/64 |
| 2004/0033415 A1 | 2/2004 | Chen et al. | |
| 2009/0139781 A1 * | 6/2009 | Straubel | B60L 53/14 |
| | | | 701/22 |
| 2011/0318626 A1 * | 12/2011 | Bartenschlager | H01M 10/625 |
| | | | 62/239 |
| 2012/0301765 A1 | 11/2012 | Loo et al. | |
| 2012/0312612 A1 * | 12/2012 | Harrison, III | H01M 10/425 |
| | | | 180/68.5 |
| 2012/0312614 A1 | 12/2012 | Fujiwara et al. | |
| 2012/0321927 A1 | 12/2012 | Loo et al. | |
| 2013/0248264 A1 | 9/2013 | Matsuda et al. | |
| 2014/0060944 A1 * | 3/2014 | Fillion | H01M 10/663 |
| | | | 429/82 |
| 2014/0370367 A1 | 12/2014 | Higuchi et al. | |
| 2015/0107921 A1 * | 4/2015 | Naruke | B60K 1/04 |
| | | | 180/68.5 |
| 2015/0295287 A1 * | 10/2015 | Schnaars | H01M 10/625 |
| | | | 165/80.4 |
| 2016/0294025 A1 * | 10/2016 | Choi | H01M 10/6556 |
| 2020/0108690 A1 * | 4/2020 | Tan | H01M 10/6556 |
| 2022/0158267 A1 * | 5/2022 | Kim | H01M 10/6556 |
| 2022/0348094 A1 * | 11/2022 | Pan | H02P 25/22 |

* cited by examiner

VEHICULAR BATTERY UNIT AND VEHICULAR UNDERBODY INCLUDING THE SAME

CROSS-REFERENCE TO RELATED APPLICATION(S)

This application is a continuation-in-part (CIP) of U.S. Ser. No. 16/827,604 filed on Mar. 23, 2020, which claims under 35 U.S.C. § 119(a) the benefit of Korean Patent Application No. 10-2019-0123264, filed on Oct. 4, 2019 in the Korean Intellectual Property Office, the entire contents of which are incorporated herein by reference. This application also claims under 35 U.S.C. § 119(a) the benefit of Korean Patent Application No. 10-2020-0164467, filed on Nov. 30, 2020 in the Korean Intellectual Property Office, the entire contents of which are incorporated herein by reference.

BACKGROUND

1. Technical Field

The present disclosure relates to a vehicular battery unit and a vehicular underbody including the same, more particularly, to the vehicular battery unit capable of being mounted on a lower portion of a center floor of a vehicle and the vehicular underbody including the same.

2. Description of the Related Art

An electric vehicle, such as a hybrid vehicle, a fuel-cell vehicle, or an electric vehicle, which is designed to be driven using an electric motor, is provided with a high-voltage battery unit configured to store in the high-voltage battery unit the driving power to be supplied to the electric motor.

Generally, a high-voltage battery unit may include a case defining in the high-voltage battery unit a closed internal space and a plurality of battery cells received in the case, and may further include a battery management system (BMS) configured to perform control to monitor the battery modules disposed in the closed internal space in the case and the voltage, current, temperature, and the like of the battery cells of the battery modules to thus manage the battery based on the monitoring result.

In order to mount high-voltage battery modules to an electric vehicle, there is a mode in which the high-voltage battery modules are mounted in a trunk compartment or a luggage compartment of a vehicle and a manner in which the high-voltage battery modules are externally mounted to a lower portion of a center floor of a vehicle body.

In a case in which the high-voltage battery unit is mounted in the trunk compartment or the luggage compartment, because the amount of space in the trunk compartment or the luggage compartment is reduced, there are disadvantages in that it is difficult to mount components necessary for the vehicle, such as a spare tire, in the space. Particularly, in the case of a sport utility vehicle (SUV) or a multi-purpose vehicle (MPV), there is a disadvantage in that it is difficult to mount a third-row seat or realize a completely flat arrangement utilizing the space in the luggage compartment.

In the case in which the high-voltage battery unit is mounted to the lower portion of the center floor of a vehicle, although it is possible to optimize utilization of the space in the trunk compartment or the luggage compartment, there is a disadvantage in that it is difficult to ensure a space in which to dispose a driveshaft, configured to transmit power from a powertrain (an engine and a motor) mounted to a front side of the vehicle to the rear wheels. As mentioned above, in the case in which the high-voltage battery unit is externally mounted to the lower portion of the center floor of a vehicle, a rear-wheel-drive motor must be additionally mounted on the vehicle so as to realize all-wheel drive (AWD). However, because it is impossible to increase the size of the rear-wheel-drive motor due to the limited size of the space for accommodating the rear-wheel-drive motor, there is a disadvantage in power enhancement of the vehicle.

Details described as the background art are intended merely for the purpose of promoting the understanding of the background of the present disclosure and should not be construed as an acknowledgment of the prior art that is already known to those of ordinary skill in the art.

SUMMARY

Therefore, the present disclosure provides a vehicular battery unit, which is mounted to a lower portion of a center floor of a vehicle and is capable of transmitting power from a powertrain, provided at a front side of the vehicle, to rear wheels, and a vehicular underbody including the same.

In accordance with the present disclosure, the above and other objects can be accomplished by providing a vehicular battery unit including a lower case including a pair of battery-receiving sections disposed at two lateral sides of a vehicle, and a connecting section, which is disposed between the pair of battery-receiving sections and is bent so as to be convex upwards, battery modules respectively mounted in the pair of battery-receiving sections, cooling blocks, which are disposed under the battery modules and which receive and discharge cooling water to cool the battery modules, at least one cooling water hose configured to exchange cooling water with the cooling blocks, and an upper case, which is disposed on the lower case and includes a cooling water hose coupler unit configured to connect the cooling water hose to the cooling blocks.

In an embodiment of the present disclosure, the cooling water hose coupler unit may include a cooling water hose coupler to which at least one end of the cooling water hose is coupled in a lateral direction and which is configured to communicate with the cooling hose positioned thereunder, a nipple, which is connected at one end of the nipple to one of the cooling blocks and into an opposite end of which a lower portion of the cooling water hose coupler is forcibly fitted and connected, and a sealing bracket, which is disposed between the cooling water hose coupler and an outer surface of the upper case and has in the sealing bracket a first pipe hole through which the cooling water hose coupler and the nipple extend.

In an embodiment of the present disclosure, the cooling water hose coupler may include a hose-coupling portion to which the cooling water hose is connected in a lateral direction, a lower communicating portion, which extends downwards from the hose-coupling portion and communicates with the hose-coupling portion, and a case-coupling portion, which extends in a direction perpendicular to the lower communicating portion and has in the case-coupling portion a first fixing hole, which is vertically formed through the case-coupling portion so as to fix the cooling water hose coupler to the upper case.

In an embodiment of the present disclosure, the cooling water hose coupler may further include at least one O-ring, which is provided at one end of the lower communicating portion fitted into the opposite end of the nipple so as to realize a water seal between the nipple and the lower communicating portion.

In an embodiment of the present disclosure, the one end of the nipple may be fixed to the one of the cooling blocks through brazing.

In an embodiment of the present disclosure, the sealing bracket may further include a protrusion projecting from an inner peripheral surface of the first pipe hole toward a center of the first pipe hole, the protrusion being configured to press a portion of the nipple that is disposed in the first pipe hole.

In an embodiment of the present disclosure, the sealing bracket may further include a stud projecting upwards from an upper surface of the sealing bracket for positioning of the cooling water hose coupler prior to assembly of the cooling water hose coupler.

In an embodiment of the present disclosure, the sealing bracket may have a shape corresponding to the shape of the case-coupling portion when viewed in a plan view, and may have a second fixing hole formed through a region of the sealing bracket corresponding to the first fixing hole.

In an embodiment of the present disclosure, the upper case may include a second pipe hole, which is formed through a region of the upper case corresponding to the first pipe hole and through which the cooling water hose coupler and the nipple extend, and a pop nut fitted into a region of the upper case corresponding to the second fixing hole, and the cooling water hose coupler and the sealing bracket may be fixed to the upper case by threadedly engaging a bolt, which extends through the first pipe hole and the second pipe hole, with the pop nut.

In an embodiment of the present disclosure, the upper case may further include a patch structure attached to an area of an inner surface of the upper case to which the cooling water hose coupler and the sealing bracket are fixed.

In accordance with another aspect of the present disclosure, there is provided a vehicular underbody including a center floor of a vehicle, and a battery unit including a lower case, which is disposed under the center floor and includes a pair of battery-receiving sections disposed at two lateral sides of a vehicle, and a connecting section, which is disposed between the pair of battery-receiving sections and is bent so as to be convex upwards and to have a mounting space defined between the pair of battery-receiving sections under the connecting section, battery modules respectively mounted in the pair of battery-receiving sections, cooling blocks, which are disposed under the battery modules and which receive and discharge cooling water to cool the battery modules, at least one cooling water hose configured to exchange cooling water with the cooling blocks, and an upper case, which is disposed on the lower case and includes a cooling water hose coupler unit configured to connect the cooling water hose to the cooling blocks, wherein a driveshaft of the vehicle is disposed in the mounting space.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, vehicular battery units and vehicular underbodies including the same according to some embodiments of the present disclosure will be described in detain with reference to the accompanying drawings.

First, a battery unit and a battery-unit-mounting structure according to an embodiment of the present disclosure will be described with reference to FIGS. 1 to 6.

Figure 1:
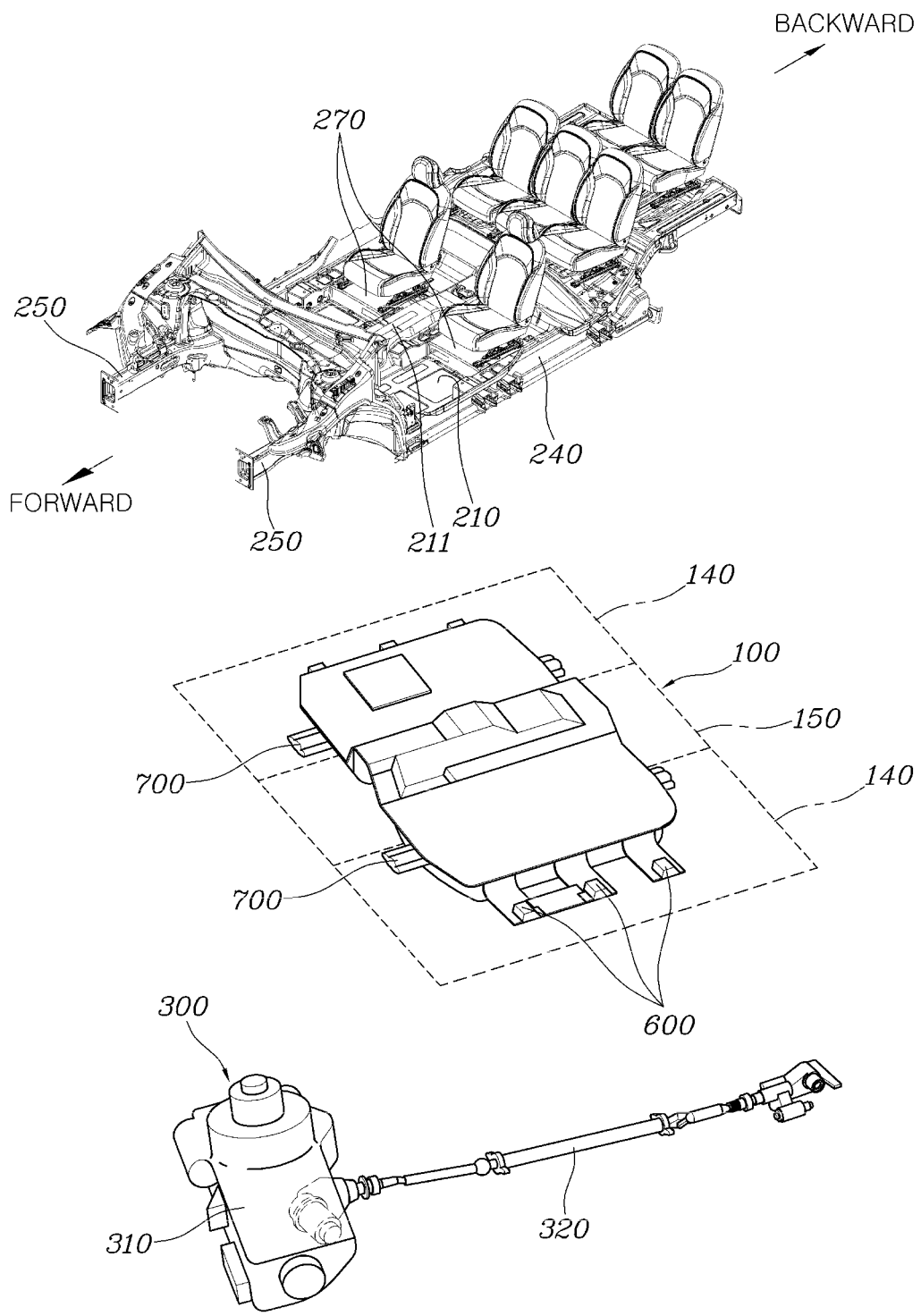
FIG. 1 is an exploded perspective view illustrating the battery unit according to an embodiment of the present disclosure and peripheral vehicular components.
Figure 2:
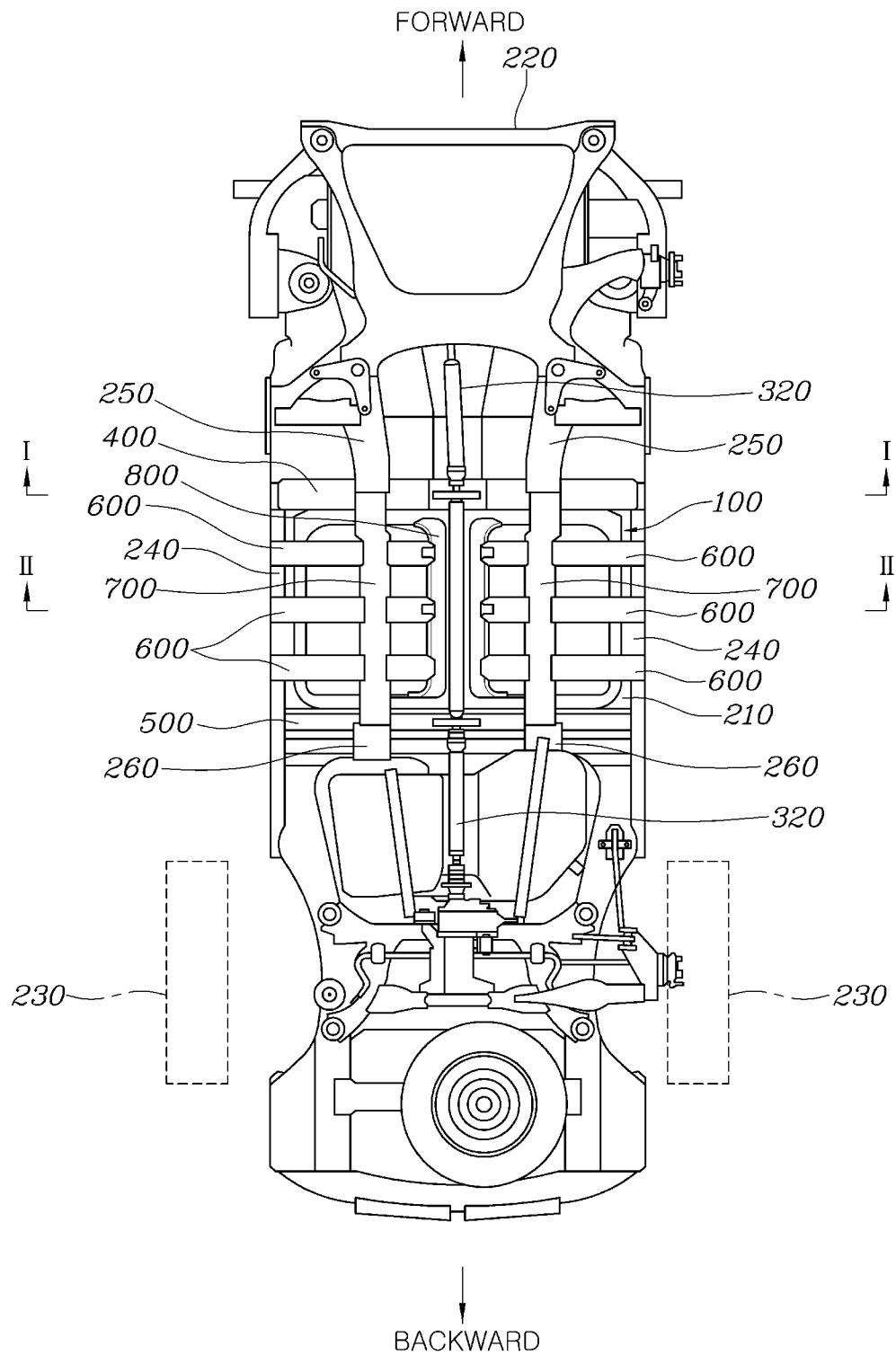
FIG. 2 is a bottom view illustrating the state in which the components shown in FIG. 1 are coupled to each other when viewed from below.
Figure 3:
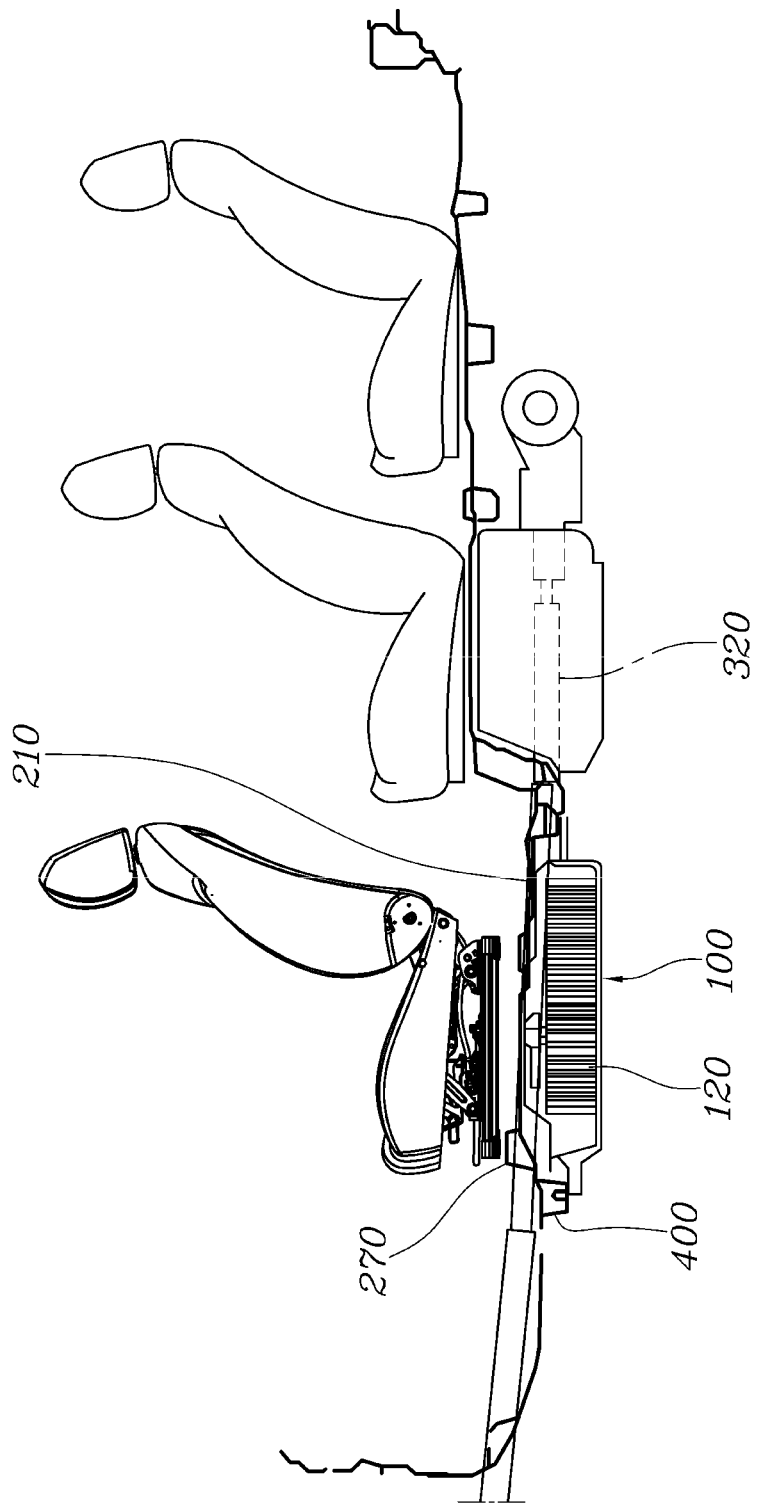
FIG. 3 is a side view illustrating the state in which the components shown in FIG. 1 are coupled to each other when viewed from a lateral side.
Figure 4:
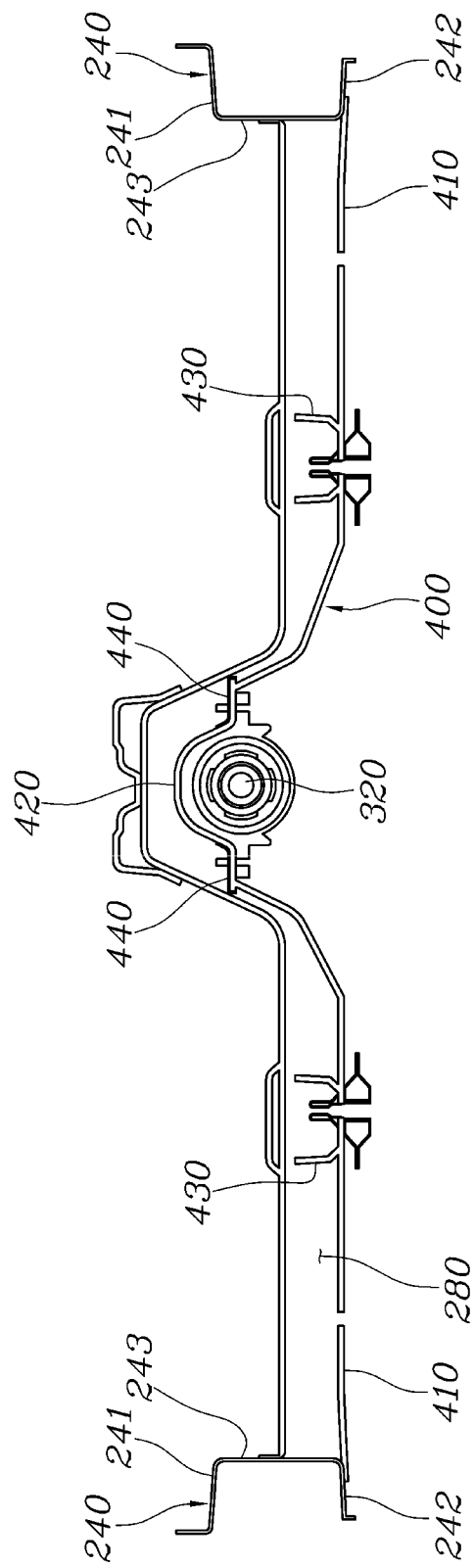
FIGS. 4 and 5 are cross-sectional views, which are respectively taken along line I-I and line II-II in FIG. 2.
Figure 5:
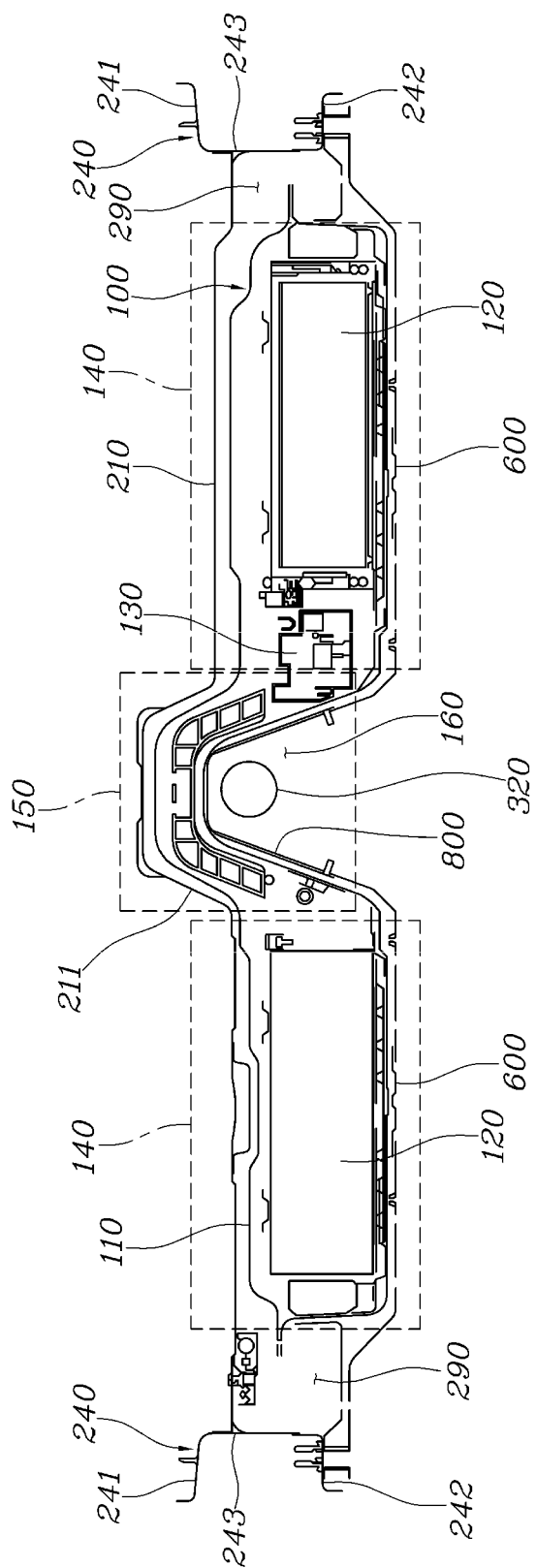
Figure 6:
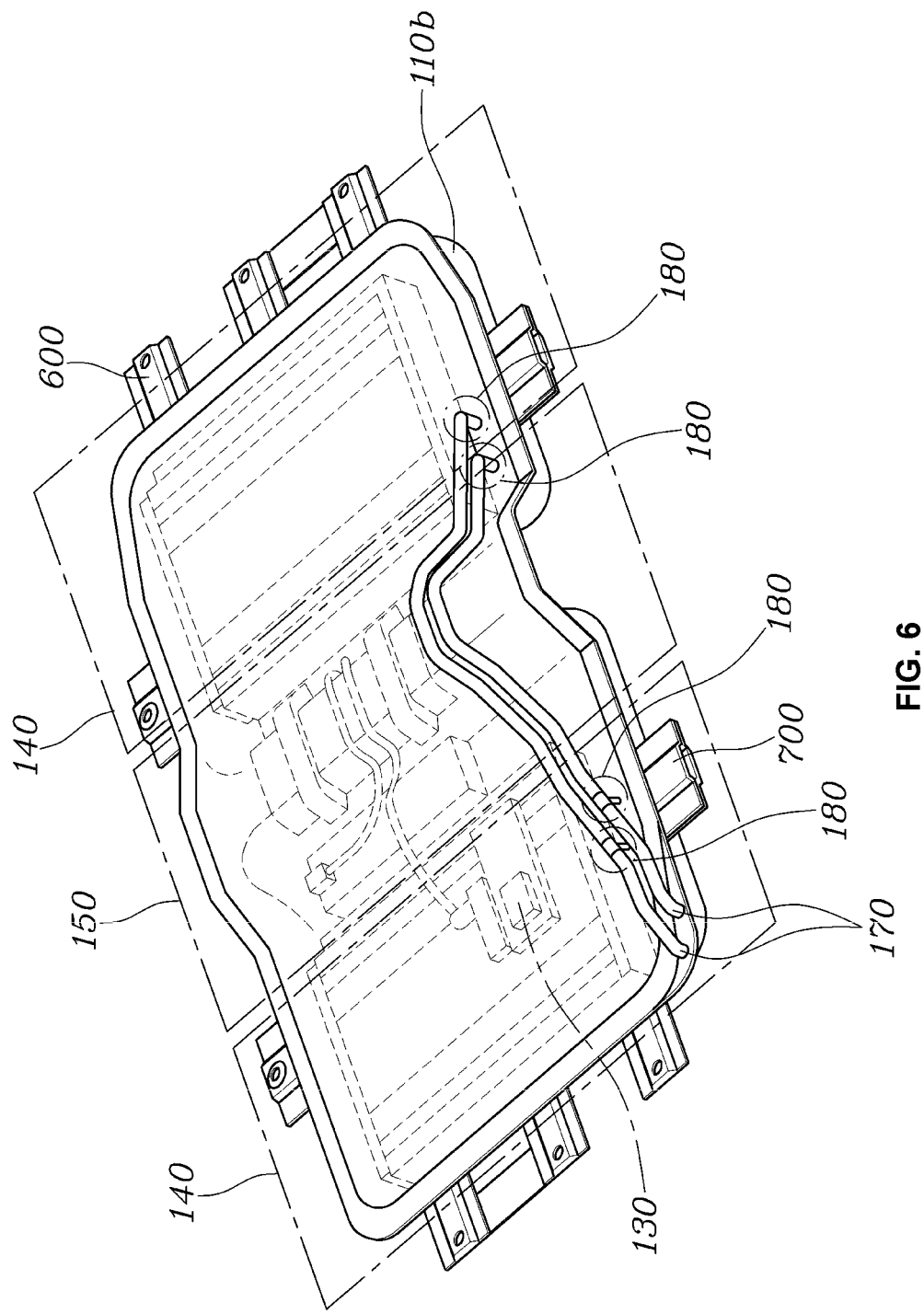
FIG. 6 is a perspective view illustrating the battery unit according to the embodiment of the present disclosure when viewed from above.

FIG. 1 is an exploded perspective view illustrating the battery unit according to an embodiment of the present disclosure and peripheral vehicular components. FIG. 2 is a bottom view illustrating the state in which the components shown in FIG. 1 are coupled to each other when viewed from below. FIG. 3 is a side view illustrating the state in which the components shown in FIG. 1 are coupled to each other when viewed from a lateral side. FIGS. 4 and 5 are cross-sectional views, which are respectively taken along line I-I and line II-II in FIG. 2. FIG. 6 is a perspective view illustrating the battery unit according to the embodiment of the present disclosure when viewed from above.

Referring to FIGS. 1 to 6, the battery unit according to the embodiment of the present disclosure may be constructed such that a driveshaft 320, which is fixedly disposed at the lower portion of the center floor 210 of the vehicle and constitutes the drive unit 300, extends anteroposteriorly through the battery unit 100 so as to transmit power to rear wheels 230.

The battery unit 100 may include a battery case including an upper case 110a and a lower case 110b, which define therebetween a closed internal space, battery modules 120 fixedly mounted in the closed internal space in the battery case, a cooling block 125, which is disposed under the battery modules 120 and which receives and discharges cooling water to cool the battery modules 120, at least one cooling hose 170 configured to exchange cooling water with the cooling block 125, and a battery management system (BMS) 130 configured to monitor and manage the voltage, current, temperature and the like of the battery modules 120 or the battery cells of the battery modules 120.

The lower case 110b of the battery unit 100 according to the embodiment of the present disclosure may be divided into two battery-receiving sections 140, which are arranged in the lateral direction of the vehicle and receive in the battery-receiving sections 140 the battery modules 120, and a connecting section 150, which is bent at a point between the two battery-receiving sections 140 so as to be convex upward and to connect the two battery-receiving sections 140 to each other.

The upper case 110a may cover the lower case 110b from above to define the closed internal space therebetween. The upper case 110a may be configured to have a shape corresponding to the shape of the upper end of the lower case 110b.

The upper case 110a may include a cooling water hose coupler unit 180, which is configured to supply cooling water to the cooling block 125 and is connected to the cooling hose 170, through which the cooling water from the cooling block 125 is discharged.

Each of the battery modules 120 may include a plurality of battery cells, which are electrically connected to each other. The voltage of each of the battery modules 120 may be determined depending on serial/parallel connection of the plurality of battery cells included in the battery modules 120.

Because some embodiments of the present disclosure are constructed such that the two battery modules 120 are respectively disposed in the two battery-receiving sections 140, which are spatially isolated from each other by the connecting section 150, and the BMS 130 is mounted to one of the two battery-receiving sections 140, a high-voltage power wire connected to the battery module 120 received in one of the two battery-receiving sections 140 needs to extend to the other battery-receiving section 140. In this case, the high-voltage power wire may be disposed along the connecting section 150, which connects the two battery-receiving sections 140 to each other.

The battery unit 100 may be externally fixed to the lower portion of the center floor 210 of the vehicle, and the center floor 210 may be provided with a center tunnel 211, which is bent so as to project upwards and extends in the anteroposterior direction of the vehicle.

The battery unit 100 may be constructed such that the battery-receiving sections 140 of the battery unit 100 are positioned at the two lateral sides of the center tunnel 211. The connecting section 150 may be bent so as to project upwards together with the center tunnel 211 of the center floor 210 such that the connecting section 150 is mounted to the center floor 210 in the state of being fitted into the center tunnel 211.

In other words, the connecting section 150 may be configured so as to connect the upper portions of the two battery-receiving sections 140, which are positioned at the two lateral sides of the center tunnel 211, to each other and to be disposed in and along the center tunnel 211 at the projecting portion thereof. The connecting section 150 may be provided in the connection section 150 with a mounting space 160, which extends between the two battery-receiving sections 140 and is open anteroposteriorly.

According to an embodiment of the present disclosure, the driveshaft 320, which constitutes the drive unit 300 of the vehicle, may be disposed in the mounting space 160. In other words, since the battery unit 100 according to the embodiment of the present disclosure is constructed such that the mounting space 160 is provided under the case, it is possible to ensure a space in which to dispose the driveshaft 320, configured to transmit the power from a powertrain 310 positioned in the front of the vehicle, to the rear wheels, even when the battery unit 100 is mounted to the lower portion of the center floor 210.

The battery unit 100 according to an embodiment of the present disclosure may include a cooling unit, configured to cool the battery modules 120 disposed in the battery-receiving section 140. The battery unit 100 according to an embodiment of the present disclosure may be provided with the cooling block 125, which is disposed under the battery modules 120 so as to be in surface contact with the battery modules 120 to thus perform heat exchange therebetween, thereby cooling the battery modules 120. The cooling block 125 may include a pair of cooling blocks 125, which are respectively disposed in the pair of battery-receiving sections 140.

Cooling water is introduced into and then discharged from the cooling blocks 125 so as to obtain desired cooling performance. To this end, the battery unit 100 according to an embodiment of the present disclosure may include the cooling water hose 170, which serves to introduce cooling water into the cooling block 125 and discharge the cooling water from the cooling blocks 125.

The cooling water hose 170 may include a hose configured to provide the cooling blocks 125 with cooling water, which flows by a unit such as a compressor mounted to a cooling pipe configured to circulate the cooling water, and a hose configured to discharge the cooling water, circulated through the cooling blocks 125, from the cooling blocks 125. The cooling water hose 170 and the cooling blocks 125 may communicate with each other via the cooling water hose coupler unit 180 provided at the upper case 110a such that cooling water flows therebetween.

Next, the structure of the cooling water hose coupler unit, which is provided at the vehicular battery units according to some embodiments of the present disclosure, will be described in detail with further reference to FIGS. 7 to 11.

Figure 7:
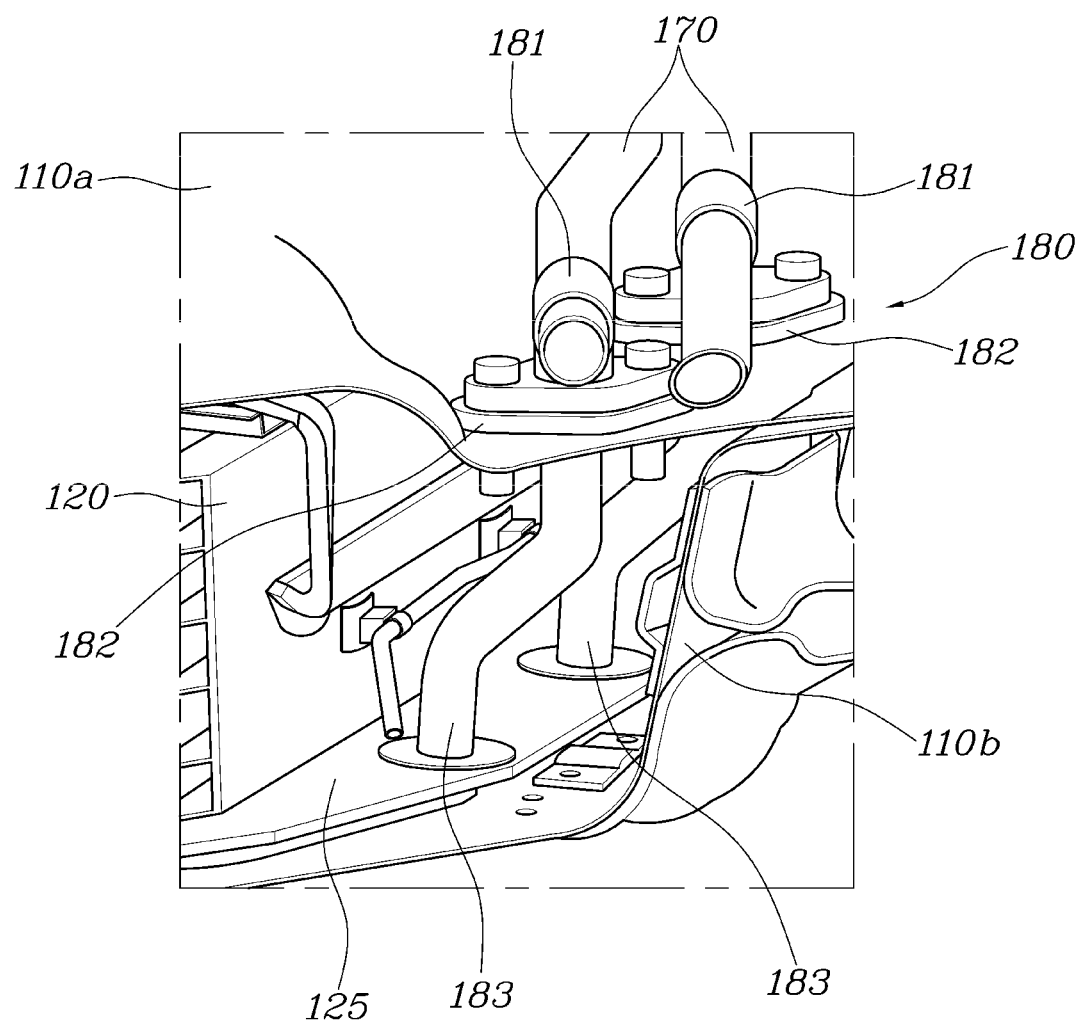
FIG. 7 is a view illustrating a region corresponding to the cooling water hose coupler unit of the battery unit according to an embodiment of the present disclosure.
Figure 8:
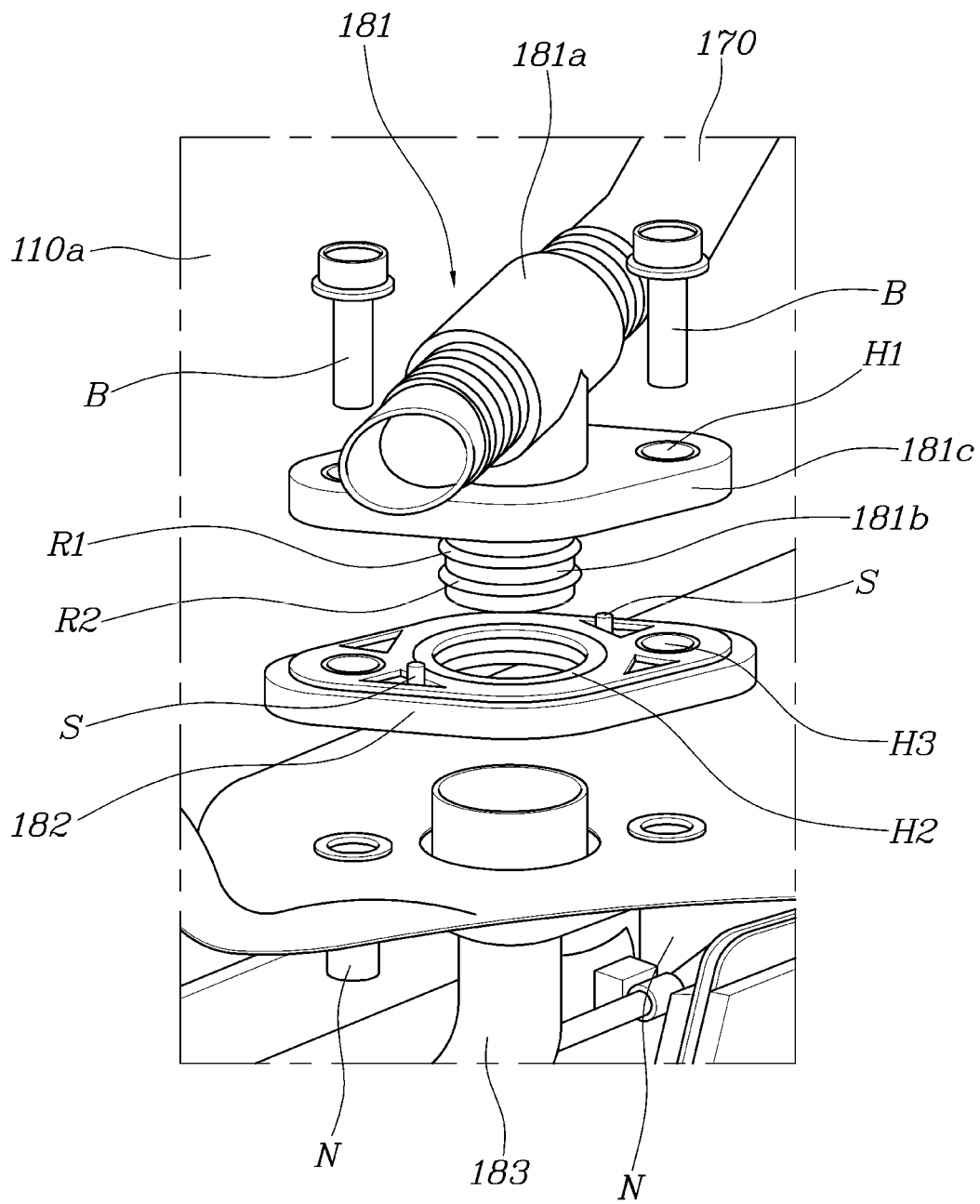
FIG. 8 is an exploded perspective view of the cooling water hose coupler unit of the battery unit according to an embodiment of the present disclosure.
Figure 9:
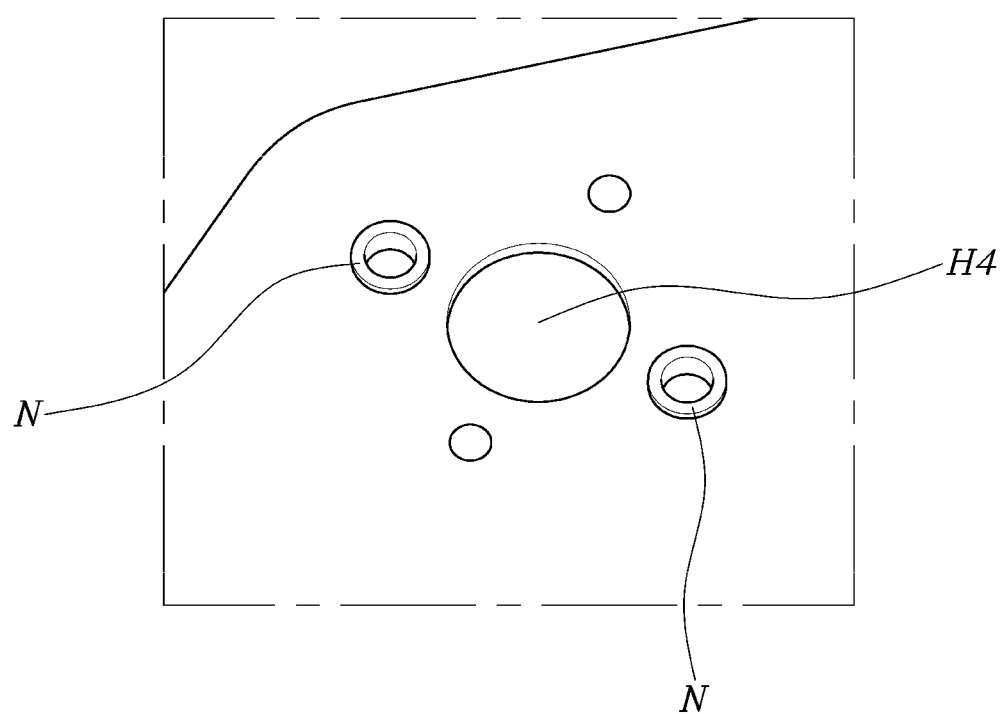
FIGS. 9 and 10 are views illustrating a portion at which the cooling water hose coupler unit of the upper case of the battery unit according to an embodiment of the present disclosure is formed when viewed from above and below, respectively.
Figure 10:
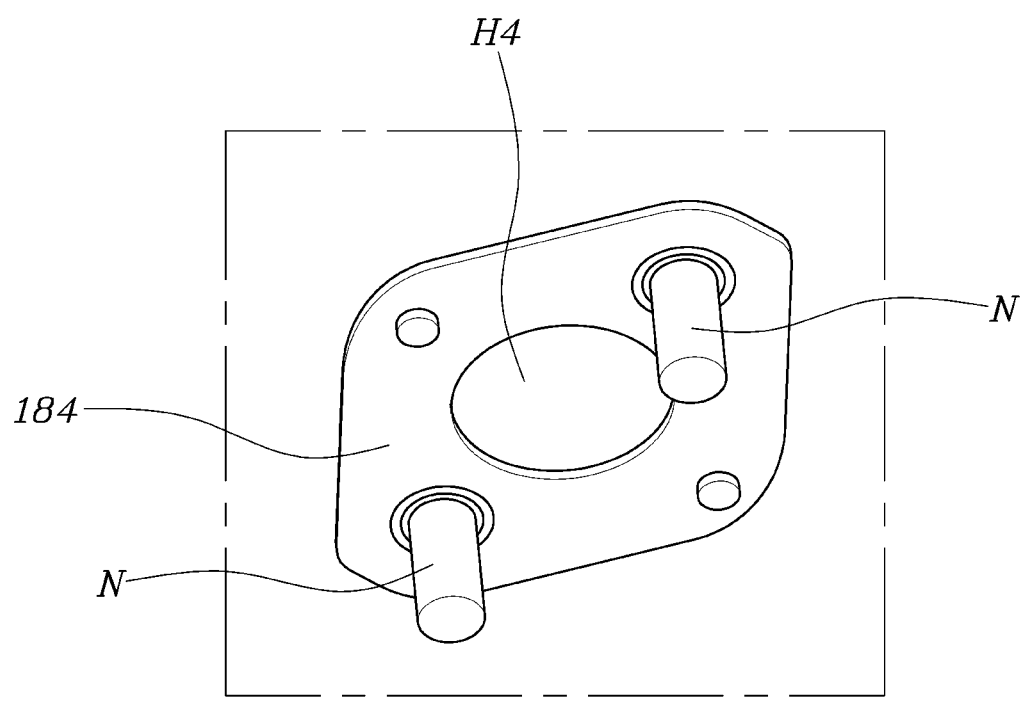
Figure 11:
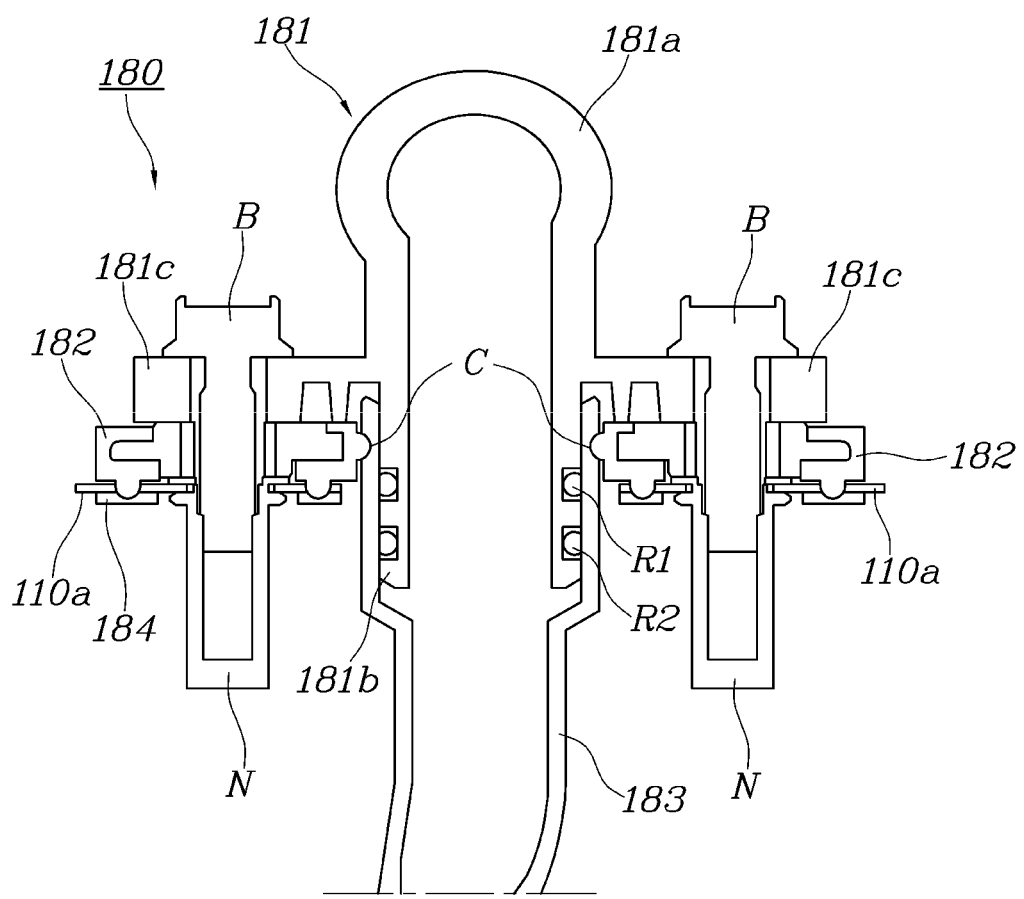
FIG. 11 is a side cross-sectional view of the cooling water hose coupler unit of the battery unit according to an embodiment of the present disclosure.

FIG. 7 is a view illustrating a region corresponding to the cooling water hose coupler unit of the battery unit according to an embodiment of the present disclosure. FIG. 8 is an exploded perspective view of the cooling water hose coupler unit of the battery unit according to an embodiment of the present disclosure. FIGS. 9 and 10 are views illustrating a portion at which the cooling water hose coupler unit of the upper case of the battery unit according to an embodiment of the present disclosure is formed when viewed from above and below, respectively. FIG. 11 is a side cross-sectional view of the cooling water hose coupler unit of the battery unit according to an embodiment of the present disclosure.

The cooling water hose coupler unit 180 may include a cooling water coupler 181, to which at least one end of the cooling water hose 170 is coupled in a lateral direction and which is configured to communicate with the cooling hose positioned thereunder, a nipple 183, which is connected at one end of the nipple to the cooling block 125 and into an opposite end of which the lower portion of the cooling water hose coupler 181 is forcibly fitted and connected, and a sealing bracket 182, which is disposed between the cooling water hose coupler 181 and the outer surface of the upper case 110a and has a pipe hole H2 through which the cooling water hose coupler 181 and the nipple 183 extend.

The cooling water hose coupler 181 may include a hose-coupling portion 181a to which the cooling water hose 170 is connected in a lateral direction, and a lower communicating portion 181b, which extends downwards from the hose-coupling portion 181a and communicates with the hose-coupling portion 181a. Furthermore, the cooling water hose coupler 181 may include a case-coupling portion 181c, which extends in a direction perpendicular to the lower communicating portion 181b and has a fixing hole H1, which is vertically formed through the case-coupling portion 181c so as to fix the cooling water hose coupler 181 to the upper case 110a.

The cooling water hose 170 may be coupled to the hose-coupling portion 181a. Because the hose-coupling portion 181a of the cooling water hose coupler 181, through which cooling water is introduced into and discharged from the cooling block 125 disposed at one of the pair of battery-receiving sections 140, must be connected to the cooling water hose, through which cooling water is introduced into and discharged from the cooling block 125 disposed at the other of the pair of battery-receiving sections 140, the cooling water hose coupler 181 may be configured such that two cooling water hoses are coupled to the two sides of the cooling water hose coupler 181. Meanwhile, the hose-coupling portion 181a, through which cooling water is introduced into and discharged from the cooling block 125 disposed at the other of the pair of battery-receiving sections 140, may be configured such that the cooling water hose 170 is connected to only one side of the hose-coupling portion 181a.

The lower communicating portion 181b may be configured to communicate with the hose-coupling portion 181a in a downward direction such that the cooling water that flows through the cooling water hose 170 connected to the hose-coupling portion 181a, is transmitted to a component thereunder or such that the cooling water in the lower component is supplied to the cooling water hose 170 connected to the hose-coupling portion 181a.

One end of the lower communicating portion 181b may be configured so as to be forcibly fitted into the nipple 183 such that cooling water is supplied to the nipple 183 and the cooling water flowing from the nipple 183 is transmitted to the cooling water hose 170. In order to prevent leakage of cooling water between the lower communicating portion 181b and the nipple 183, a portion of the lower communicating portion 181b, which is forcibly fitted into the nipple 183, may be provided with one or more O-rings R1 and R2.

The cooling water hose coupler 181 may further include the case-coupling portion 181c, which is configured to extend in a direction perpendicular to the lower communicating portion 181b, that is, in a direction parallel to the upper surface of the upper case 110a on which the cooling water hose coupler unit 180 is disposed. The case-coupling portion 181c may have the fixing hole H1, which is vertically formed through the case-coupling portion 181c, and thus the cooling water hose coupler 181 is capable of being fixed to the upper case 110a by a bolt B extending through the fixing hole H1.

One end of the nipple 183 may be coupled to the cooling block 125 through brazing. By coupling the nipple 183 to the cooling block 125 through brazing, it is possible to ensure a robust connecting structure and to prevent leakage between the cooling block 125 and the nipple 183.

The sealing bracket 182 may be disposed between the cooling water hose coupler 181 and the outer surface of the upper case 110a so as to prevent cooling water from flowing into the space, which is defined between the upper and lower cases and in which the battery modules 120 are disposed, upon leakage of cooling water.

The sealing bracket 182 may have the pipe hole H2, into which the portion connecting the nipple 183 and the cooling water hose coupler 181 is fitted, and a fixing hole H3, which is formed at a position corresponding to the fixing hole H1 formed in the case-coupling portion 181c of the cooling water hose coupler 181. Furthermore, the sealing bracket 182 may include a protrusion C, which projects toward the center of the pipe hole H2 from the inner peripheral surface of the pipe hole H2. The protrusion C may press the outer peripheral surface of the nipple 183 disposed in the pipe hole H2 to thus prevent leaking cooling water from entering the space between the upper and lower cases along the outer peripheral surface of the nipple 183. Specifically, when leakage of cooling water occurs between the nipple 183 and the lower coupling portion 181b of the cooling water coupler 181 for an unexpected cause, regardless of the plurality of O-rings R1 and R2, the protrusion C prevents the leaking cooling water from entering the space between the upper and lower cases along the outer peripheral surface of the nipple 183, and thus the cooling water flows to the outside of the upper case 110*a* along the upper surface of the sealing bracket 182.

The sealing bracket 182 may have a shape corresponding to the shape of the case-coupling portion 181*c* of the cooling water hose coupler 181 when viewed from above, and may thus have the fixing hole H3 formed at a position corresponding to the fixing hole H1 formed through the case-coupling portion 181*c*. Furthermore, the sealing bracket 182 may be provided on the upper surface of the sealing bracket 182 with a stud S, which is configured to position the cooling water hose coupler 181 upon assembly of the cooling water hose coupler unit 180. By virtue of the stud S, the cooling water hose coupler unit 180 may be positioned prior to fastening by a bolt.

Furthermore, a pipe hole H4 may be formed through a region of the upper case 110*a* at which the cooling water hose coupler unit 180 is formed such that the nipple 183 is exposed to the outside of the upper case 110*a*, and through holes may be formed through regions of the upper case 110*a* near the pipe hole H4 corresponding to the fixing holes H1 and H3. A pop nut N may be fitted into the upper case 110*a* through each of the through holes.

The cooling water hose coupler 181 and the sealing bracket 182 may be coupled to the upper case through only one fastening process of threadedly engaging the bolt B with the pop nut N through the fixing holes H1 and H3. According to an embodiment of the present disclosure, since the cooling water hose coupler 181 and the sealing bracket 182 are coupled simultaneously as mentioned above, it is possible to ensure sufficient clamping force with respect to the O-rings and the sealing bracket using axial force at the time of assembly, thereby conferring an advantage of ensuring reliable sealing performance.

According to an embodiment of the present disclosure, the upper case 110*a* may further include a patch structure 184 attached to the area of the inner surface of the upper case 110*a* to which the cooling water hose coupler 181 and the sealing bracket 182 are fixed. The patch structure 184 is capable not only of increasing the rigidity of the cooling water hose coupler unit 180 but also of realizing a robust sealing structure by providing sufficient clamping force with respect to the sealing bracket 182.

Next, the vehicular underbody according to an embodiment of the present disclosure will be described with reference to the remaining drawings.

Figure 12:
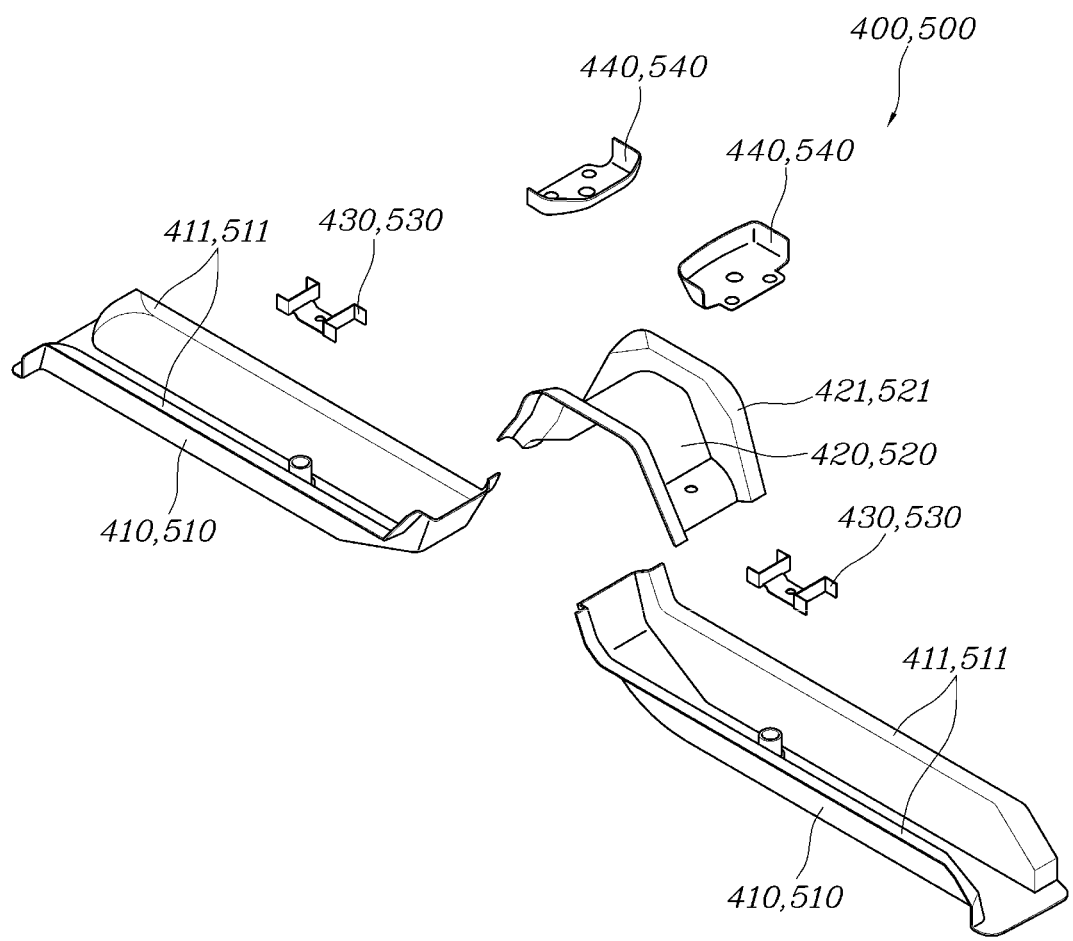
FIG. 12 is an exploded perspective view of a front cross member and a rear cross member provided in the vehicular underbody according to an embodiment of the present disclosure.
Figure 13:
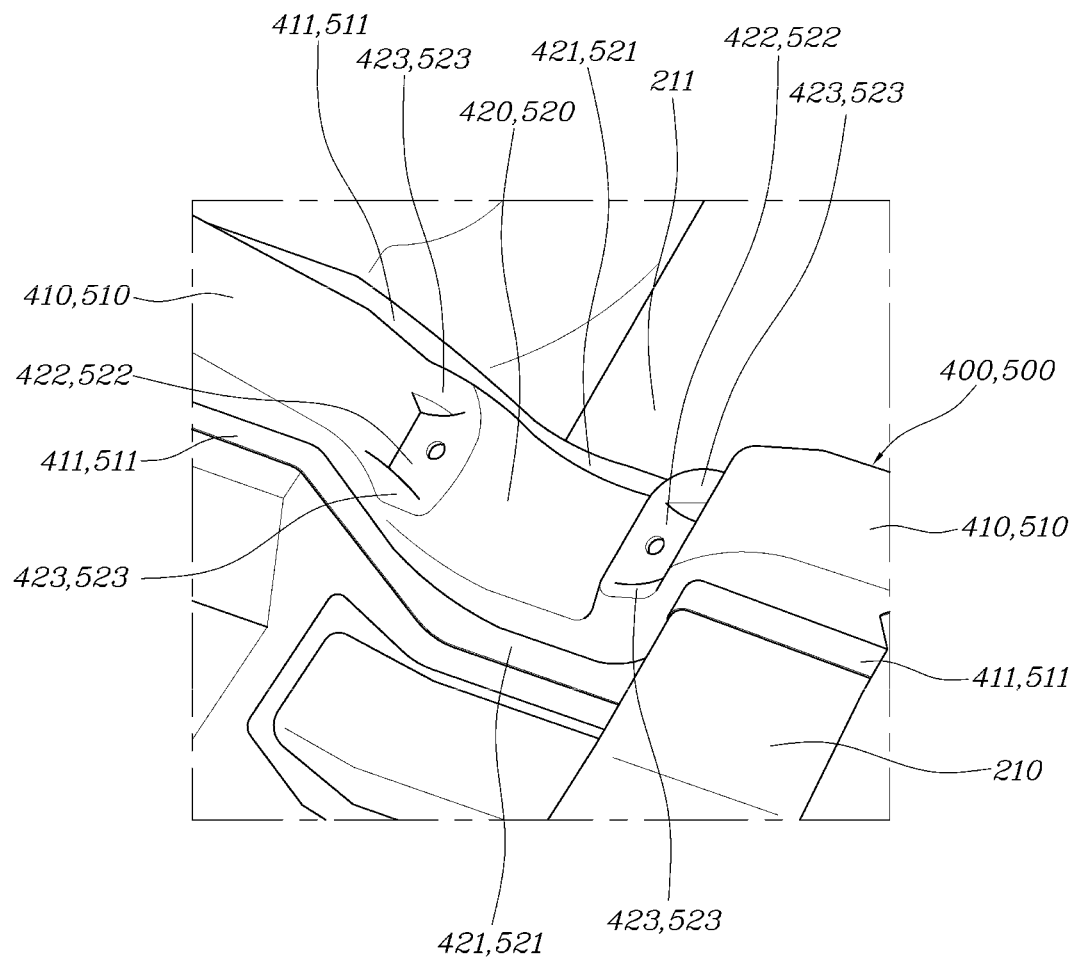
FIG. 13 is a bottom perspective view illustrating the state in which the front cross member and the rear cross member, which are provided in the vehicular under body according to an embodiment of the present disclosure, are coupled to the center floor.
Figure 14:
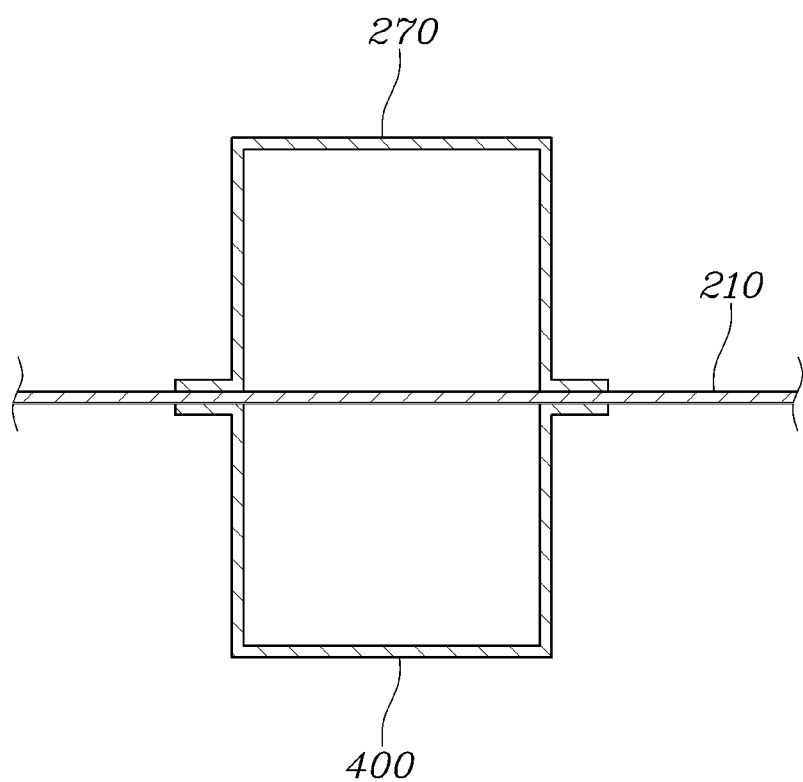
FIGS. 14 and 15 are views illustrating examples of a structure for coupling the front cross member to a seat cross member according to an embodiment of the present disclosure.
Figure 15:
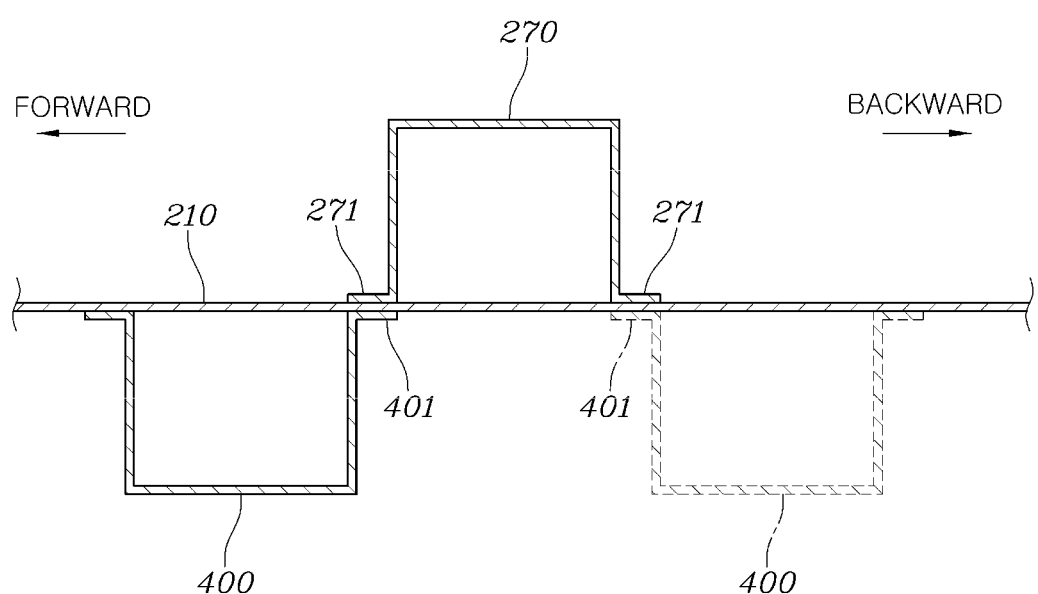

FIG. 12 is an exploded perspective view of a front cross member and a rear cross member provided in the vehicular underbody according to an embodiment of the present disclosure. FIG. 13 is a bottom perspective view illustrating the state in which the front cross member and the rear cross member, which are provided in the vehicular under body according to an embodiment of the present disclosure, are coupled to the center floor. FIGS. 14 and 15 are views illustrating examples of a structure for coupling the front cross member to a seat cross member according to an embodiment of the present disclosure.

The drive unit 300 of the vehicle may include the powertrain 310, which includes an engine and a motor, and the driveshaft 320 configured to transmit the power from the powertrain 310.

The powertrain 310 may be fixedly mounted to a sub frame 220 positioned at the front side of the vehicle, and the driveshaft 320 may be connected at one end of the driveshaft 320 to the powertrain 310 and may extend in the antero-posterior direction of the vehicle. As described above, the driveshaft 320 may be disposed in the mounting space 160 of the connecting section 150 of the battery unit 100. Although not shown, an exhaust pipe, which extends from the powertrain 310 in the rearward direction of the vehicle, may also be disposed in the mounting space 160.

As is well known in the art, the driveshaft 320 of the vehicle is a component configured to transmit the power from the powertrain 310 to the rear wheels 230. Because the power generated by the powertrain 310 is transmitted to the rear wheels 230 via the driveshaft 320, the rear wheels 203 may be driven by the power from the powertrain 310 mounted to the front side of the vehicle.

Because the battery unit 100 is mounted to the lower portion of the center floor 210, the front cross member 400 and the rear cross member 500 are fixedly mounted to the lower portion of the center floor 210 at the front and rear sides, respectively, of the battery unit 100.

Because the front cross member 400 and the rear cross member 500 extend in the lateral direction of the vehicle and are connected at both ends thereof to side sills 240 positioned at the two lateral sides of the vehicle, a load path toward the side sills 240 may be provided.

The front cross member 400 may be connected to the rear end of a front side member 250 so as to form a load path capable of transmitting the load to the front side member 250, and the rear cross member 500 may be connected to the front end of the rear side member 260 so as to form a load path capable of transmitting the load to the rear side member 260.

Since both the front cross member 400 and the rear cross member 500 are connected to the vehicular components (for example, the center floor, the side compartments, the front side member, and the rear side member), it is possible to increase the rigidity of the vehicle and thus to improve R&H (Ride and Handling) performance and suppression of NVH (Noise, Vibration, and Harshness).

Because the battery unit 100, which is mounted to the lower portion of the center floor 210 outside the vehicle, is surrounded at the outer periphery of the battery unit 100 by the side sills 240, which are positioned at the two lateral sides of the vehicle, and the front and rear cross members 400 and 500, which are positioned at the front and rear sides of the vehicle, the battery unit 100 may be positioned at a predetermined position defined between the side sills 240, which are positioned at the two lateral sides of the vehicle, and the front and rear cross members 400 and 500, which are positioned at the front and rear sides of the vehicle. Furthermore, the battery unit 100 may be constructed so as to be sufficiently protected from impacts in an anteroposterior direction and a lateral direction of the vehicle.

Because the driveshaft 320 of the drive unit 300, which is disposed so as to extend through the mounting space 160 of the connecting section 150, is mounted to at least one of the front cross member 400, the rear cross member 500 and the battery unit 100, it is possible to provide increased coupling force.

The seat cross member 270 may extend in a lateral direction, and may be coupled to the upper portion of the center floor 210. The front cross member 400 may be disposed so as to overlap the seat cross member 270 in a vertical direction with the center floor 210 interposed therebetween. Consequently, since the seat cross member 270 overlaps the front cross member 400 in a vertical direction, it is possible to ensure further improved durability and thus to further increase the strength and rigidity of the vehicle body.

Alternatively, the front cross member 400 may be disposed before or behind the seat cross member 270, and may be connected to the seat cross member 270 via flanges 271 of the seat cross member 270 and flanges 401 of the front cross member 400 with the center floor 210 interposed therebetween.

Each of the front cross member 400 and the rear cross member 500 may include a pair of side parts 410, 510 and a connecting part 420, 520 connecting the pair of side parts 410, 510 to each other.

Each of the side parts 410 and 510 may extend approximately linearly, and may have a U-shaped cross section. Each of the connecting parts 420 and 520 may be configured to have a tunnel shape, which is convex upwards, and may have a U-shaped cross section, like the side parts 410 and 510.

Each of the connecting parts 420 and 520 may be disposed in the center tunnel 211 of the center floor 210 and may be mounted in the center tunnel 211 of the center floor 210.

The two outer ends of each of the side parts 410 and 510 may be connected to the side sills 240 of the vehicle so as to form a lateral load path, and the two inner ends of each of the side parts 410 and 510 may be coupled to the two ends of each of the connecting parts 420 and 520 in the overlapping state, thereby providing increased coupling force.

Each of the side parts 410 and 510 and the connecting parts 420 and 520 may be configured to have a U-shaped cross section, which is open upwards, and flanges 411 and 421, 511 and 521 formed at the edges of the open portion may be in surface contact with the lower surface of the center floor 210, thereby defining a closed space 280 between the center floor 210 and the side sills 240 and the side parts 410, 510 and the connecting part 420, 520. Consequently, by virtue of the closed space 280, it is possible to further increase the strength and rigidity of the vehicle body.

The two ends of each of the connecting parts 420 and 520 may be provided with respective coupling surfaces 422, 522, to which the driveshaft 320 is coupled, and the two sides of each of the coupling surfaces 422 and 522 may be provided with respective beads 423, 523, which are connected to the side parts 410, 510.

Although each of the coupling surfaces 422, 522 is preferably configured to have a flat surface in order to increase the coupling force between the driveshaft 320 and the coupling surfaces, the present disclosure is not limited thereto. Each of the coupling surfaces 422, 522 may be configured to have a surface corresponding to the mounting surface of the driveshaft 320 so as to realize surface contact with the mounting surface of the driveshaft 320.

Because the beads 423, 523 of the connecting part 420, 520 may be connected to the side parts 410, 510, it is possible to further increase the rigidity of the portions connecting the connecting part 420, 510 and the side parts 410, 510 by virtue of the beads 423, 523.

A reinforcing bracket 430, 530 may be coupled to the inner surface of each of the side parts 410 and 510. First reinforcing brackets 430, which are coupled to the side parts 410 of the front cross member 400, may be coupled to the front ends of longitudinal members 700, which will be described later, and second reinforcing brackets 530, which are coupled to the side parts 510 of the rear cross member 500, may be coupled to the front ends of the longitudinal members 700.

Since the first reinforcing brackets 430 are coupled to the coupling portions between the front cross member 400 and the longitudinal member 700 and the second reinforcing brackets 530 are coupled to the coupling portions between the rear cross members 500 and the longitudinal member 700, it is possible to further increase the rigidity of the coupling portions.

Second reinforcing brackets 440, 540 may be coupled to the coupling surfaces 422, 522 of the connecting part 420, 520, to which the driveshaft 320 is coupled, in order to increase the rigidity of the coupling portions.

The battery unit 100, which is mounted to the lower portion of the center floor 210 outside the vehicle, may be supported at the lower portion of the battery unit 100 by the plurality of cross members 600 and the plurality of longitudinal members 700, and may be connected to the vehicle body.

In other words, the plurality of cross members 600, which extend laterally and are spaced apart from each other in an anteroposterior direction, are coupled to the lower surfaces of the battery-receiving sections 140, and the plurality of longitudinal members 700, which extend in an anteroposterior direction, are respectively coupled to the lower surfaces of the battery-receiving sections 140. The vehicular underbody may further a connecting-section-reinforcing member 800, which is concave into the connecting section 150, is coupled thereto, and extends anteroposteriorly along the mounting space 160.

The cross member 600 may be disposed across the longitudinal member 700. Here, the cross member 600 may be connected at one end of the cross member 600 to the side sill 240 of the vehicle and at the other end of the cross member 600 to the connecting-section-reinforcing member 800 so as to form the lateral load path.

Furthermore, the cross member 600 may also be connected to the longitudinal member 700 so as to form the anteroposterior load path.

Alternatively, the cross members 600 may be respectively provided at the two lateral sides of the longitudinal member 700 such that ends of the cross members 600 are respectively connected to the two lateral side portions of the longitudinal member 700 and the remaining ends of the cross members 600 are respectively connected to the side sill 240 and the connecting-section-reinforcing member 800.

In this structure, because the cross members 600 and the longitudinal member 700 do not overlap each other in a vertical direction, there is an advantage in that is possible to reduce the vertical height of the members.

Each of the side sills 240, which are disposed at the two lateral sides of the vehicle, is configured to have an upper surface 241, a lower surface 242, and a side surface 243 when viewed in a transverse sectional view, and each of the two lateral ends of the center floor 210 are connected to the side surface 243 of the side sill 240, with the result that the center floor 210 is provided thereunder with a reception space 290, which is defined between the lower surface of the center floor 210 and the side surface 243 of the side sill 240 so as to be open downwards.

The battery-receiving section 140 of the battery unit 100 is positioned in the reception space 290 such that the upper portion of the battery-receiving section 140 is received in the reception space 290 and the lower portion of the battery-receiving section 140 projects downwards from the side sill 240.

By virtue of the mounting structure of the battery-receiving section 140, the center floor 210 can be lowered as close to the ground as possible, thereby making it possible to ensure a sufficiently large passenger compartment. Furthermore, since a large portion of the upper end of the battery-receiving section 140 is positioned in the reception space 290, it is possible to sufficiently increase the distance between a road surface and the battery-receiving section 140.

As described above, the vehicular battery unit and the vehicular underbody including the same according to some embodiments of the present disclosure are constructed such that the battery unit 100 for an electric vehicle is externally and fixedly mounted to the lower portion of the center floor 210 of the vehicle. Consequently, since it is possible to maximize utilization of the trunk compartment, there is an advantage of improved merchantability.

Furthermore, the vehicular battery unit and the vehicular underbody including the same according to some embodiments of the present disclosure are constructed such that the battery unit 100 is mounted to the lower portion of the center floor 210 and such that the driveshaft 320, which constitutes the drive unit 300 of the vehicle, extends through the mounting space 160 of the connecting section 150 between the two battery-receiving sections 140 in order to transmit the power from the powertrain 310 to the rear wheels 230. Consequently, since no additional motor for driving the rear wheels is used, there are advantages of reducing manufacturing costs and weight and improving fuel efficiency.

In addition, the vehicular battery unit and the vehicular underbody including the same according to some embodiments of the present disclosure are constructed such that the battery unit 100, which is mounted to the lower portion of the center floor 210, is connected to components of the vehicle body, such as the side sills 240, the front side members 250, and the rear side members 260 via the cross members 600, the longitudinal members 700, the front cross member 400, and the rear cross member 500. Consequently, since the rigidity of the vehicle body is increased, it is possible to improve the R&H (Ride & Handling) performance of the vehicle and to suppress NVH (Noise, Vibration, and Harshness).

As is apparent from the above description, in the vehicular battery unit and the vehicular underbody including the same according to some embodiments of the present disclosure, since the battery unit is externally and fixedly mounted to the lower portion of the center floor of the vehicle, it is possible to maximize utilization of the trunk compartment or the luggage compartment, thereby offering an effect of improved merchantability.

Particularly, because the battery unit is mounted to the lower portion of the center floor and because the space in which the driveshaft constituting the drive unit of the vehicle is mounted so as transmit power to the rear wheels of the vehicle is ensured, it is possible to realize four-wheel driving even without using an additional motor for driving the rear wheels, thereby offering effects of reducing manufacturing costs and weight and improving fuel efficiency.

Furthermore, in the vehicular battery unit and the vehicular underbody including the same according to some embodiments of the present disclosure, since the battery unit, which is mounted to the lower portion of the center floor, is connected to components of the vehicle body, such as the side sills, the front side members and the rear side members via the cross members, the longitudinal members, the front cross member and the rear cross member, there are effects of improving the R&H (Ride & Handling) performance of the vehicle and of suppressing NVH (Noise, Vibration, and Harshness).

In addition, in the vehicular battery unit and the vehicular underbody including the same according to some embodiments of the present disclosure, there is an effect of further enhancing the sealing performance of the cooling water hose coupler unit configured to supply cooling water to the battery unit.

Although the preferred embodiments of the present disclosure have been disclosed for illustrative purposes, those skilled in the art will appreciate that various modifications, additions and substitutions are possible without departing from the scope and spirit of the disclosure as disclosed in the accompanying claims.

What is claimed is:

1. A vehicular battery unit, comprising:
    a lower case including a pair of battery-receiving sections disposed at two lateral sides of a vehicle, and a connecting section, which is disposed between the pair of battery-receiving sections and is bent so as to be convex upwards;
    battery modules respectively mounted in the pair of battery-receiving sections;
    cooling blocks, which are disposed under the battery modules and which receive and discharge cooling water to cool the battery modules;
    at least one cooling water hose configured to exchange the cooling water with the cooling blocks; and
    an upper case, which is disposed on the lower case and includes a cooling water hose coupler unit configured to connect the cooling water hose to the cooling blocks.

2. The vehicular battery unit according to claim 1, wherein the cooling water hose coupler unit includes:
    a cooling water hose coupler to which at least one end of the cooling water hose is coupled in a lateral direction and which is configured to communicate with the cooling hose positioned thereunder;
    a nipple, which is connected at one end of the nipple to one of the cooling blocks and a remaining end of the nipple being configured to receive a lower portion of the cooling water hose coupler that is forcibly fitted and connected to the remaining end of the nipple; and
    a sealing bracket, which is disposed between the cooling water hose coupler and an outer surface of the upper case and has in the sealing bracket a first pipe hole through which the cooling water hose coupler and the nipple extend.

3. The vehicular battery unit according to claim 2, wherein the cooling water hose coupler includes:
    a hose-coupling portion to which the cooling water hose is connected in the lateral direction;
    a lower communicating portion, which extends downwards from the hose-coupling portion and communicates with the hose-coupling portion; and
    a case-coupling portion, which extends in a direction perpendicular to the lower communicating portion and has in the case-coupling portion a first fixing hole, which is vertically formed through the case-coupling portion so as to fix the cooling water hose coupler to the upper case.

4. The vehicular battery unit according to claim 3, wherein the cooling water hose coupler further includes at least one O-ring, which is provided at one end of the lower communicating portion fitted into the remaining end of the nipple so as to realize a water seal between the nipple and the lower communicating portion.

5. The vehicular battery unit according to claim 2, wherein the one end of the nipple is fixed to the one of the cooling blocks through brazing.

6. The vehicular battery unit according to claim 2, wherein the sealing bracket further includes a protrusion projecting from an inner peripheral surface of the first pipe hole toward a center of the first pipe hole, the protrusion being configured to press a portion of the nipple that is disposed in the first pipe hole.

7. The vehicular battery unit according to claim 2, wherein the sealing bracket further includes a stud projecting upwards from an upper surface of the sealing bracket for positioning of the cooling water hose coupler prior to assembly of the cooling water hose coupler.

8. The vehicular battery unit according to claim 3, wherein the sealing bracket has a shape corresponding to a shape of the case-coupling portion when viewed in a plan view, and has a second fixing hole formed through a region of the sealing bracket corresponding to the first fixing hole.

9. The vehicular battery unit according to claim 8, wherein the upper case includes:
   a second pipe hole, which is formed through a region of the upper case corresponding to the first pipe hole and through which the cooling water hose coupler and the nipple extend; and
   a pop nut fitted into a region of the upper case corresponding to the second fixing hole, and
   wherein the cooling water hose coupler and the sealing bracket are fixed to the upper case by threadedly engaging a bolt, which extends through the first pipe hole and the second pipe hole, with the pop nut.

10. The vehicular battery unit according to claim 9, wherein the upper case further includes a patch structure attached to an area of an inner surface of the upper case to which the cooling water hose coupler and the sealing bracket are fixed.

11. A vehicular underbody, comprising:
    a center floor of a vehicle; and
    a battery unit including a lower case, which is disposed under the center floor and includes a pair of battery-receiving sections disposed at two lateral sides of a vehicle, and a connecting section, which is disposed between the pair of battery-receiving sections and is bent so as to be convex upwards and to have a mounting space defined between the pair of battery-receiving sections under the connecting section, battery modules respectively mounted in the pair of battery-receiving sections, cooling blocks, which are disposed under the battery modules and which receive and discharge cooling water to cool the battery modules, at least one cooling water hose configured to exchange cooling water with the cooling blocks, and an upper case, which is disposed on the lower case and includes a cooling water hose coupler unit configured to connect the cooling water hose to the cooling blocks,
    wherein a driveshaft of the vehicle is disposed in the mounting space.

12. The vehicular underbody according to claim 11, wherein the cooling water hose coupler unit includes:
    a cooling water hose coupler to which at least one end of the cooling water hose is coupled in a lateral direction and which is configured to communicate with the cooling hose positioned thereunder;
    a nipple, which is connected at one end of the nipple to one of the cooling blocks and a remaining end of the nipple being configured to receive a lower portion of the cooling water hose coupler that is forcibly fitted and connected to the remaining end; and
    a sealing bracket, which is disposed between the cooling water hose coupler and an outer surface of the upper case and has in the sealing bracket a first pipe hole through which the cooling water hose coupler and the nipple extend.

13. The vehicular underbody according to claim 12, wherein the cooling water hose coupler includes:
    a hose-coupling portion to which the cooling water hose is connected in a lateral direction;
    a lower communicating portion, which extends downwards from the hose-coupling portion and communicates with the hose-coupling portion; and
    a case-coupling portion, which extends in a direction perpendicular to the lower communicating portion and has in the case-coupling portion a first fixing hole, which is vertically formed through the case-coupling portion so as to fix the cooling water hose coupler to the upper case.

14. The vehicular underbody according to claim 13, wherein the cooling water hose coupler further includes at least one O-ring, which is provided at one end of the lower communicating portion fitted into the remaining end of the nipple so as to realize a water seal between the nipple and the lower communicating portion.

15. The vehicular underbody according to claim 12, wherein the one end of the nipple is fixed to the one of the cooling blocks through brazing.

16. The vehicular underbody according to claim 12, wherein the sealing bracket further includes a protrusion projecting from an inner peripheral surface of the first pipe hole toward a center of the first pipe hole, the protrusion being configured to press a portion of the nipple that is disposed in the first pipe hole.

17. The vehicular underbody according to claim 12, wherein the sealing bracket further includes a stud projecting upwards from an upper surface of the sealing bracket for positioning of the cooling water hose coupler prior to assembly of the cooling water hose coupler.

18. The vehicular underbody according to claim 13, wherein the sealing bracket has a shape corresponding to a shape of the case-coupling portion when viewed in a plan view, and has a second fixing hole formed through a region of the sealing bracket corresponding to the first fixing hole.

19. The vehicular underbody according to claim 18, wherein the upper case includes:
    a second pipe hole, which is formed through a region of the upper case corresponding to the first pipe hole and through which the cooling water hose coupler and the nipple extend; and
    a pop nut fitted into a region of the upper case corresponding to the second fixing hole, and
    wherein the cooling water hose coupler and the sealing bracket are fixed to the upper case by threadedly engaging a bolt, which extends through the first pipe hole and the second pipe hole, with the pop nut.

20. The vehicular underbody according to claim 19, wherein the upper case further includes a patch structure attached to an area of an inner surface of the upper case to which the cooling water hose coupler and the sealing bracket are fixed.

* * * * *